United States Patent
Willig et al.

(10) Patent No.: US 7,706,946 B2
(45) Date of Patent: Apr. 27, 2010

(54) SAFETY SYSTEM FOR VEHICLE OCCUPANTS

(75) Inventors: Rainer Willig, Tamm (DE); Pascal Kocher, Gerlingen (DE); Urs Caduff, Hemmingen (DE); Armin Verhagen, Schwieberdingen (DE); Thomas Huber, Beilstein (DE); Michael Schmid, Kornwestheim (DE); Mario Kroeninger, Buehl (DE); Stephan Hoenle, Korntal-Muenchingen (DE); Michael Bunse, Vaihingen/Enz (DE); Gero Nenninger, Markgroeningen (DE); Volker Mehl, Weingarten (DE); Joerg-Dieter Huber, Grafenau (DE); Ulf Kleuker, Gerlingen (DE); Roland Pitteroff, Markgroeningen (DE); Petra Schiebel, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 1 day.

(21) Appl. No.: 11/630,092

(22) PCT Filed: Apr. 28, 2005

(86) PCT No.: PCT/EP2005/051916

§ 371 (c)(1),
(2), (4) Date: Dec. 14, 2007

(87) PCT Pub. No.: WO2005/123462

PCT Pub. Date: Dec. 29, 2005

(65) Prior Publication Data

US 2008/0208413 A1    Aug. 28, 2008

(30) Foreign Application Priority Data

Jun. 19, 2004   (DE) .................. 10 2004 029 817

(51) Int. Cl.
*B60R 22/00* (2006.01)
(52) U.S. Cl. .................. 701/45; 180/271; 340/436
(58) Field of Classification Search ................. 701/45; 180/271; 340/436
See application file for complete search history.

(56) References Cited

U.S. PATENT DOCUMENTS

| | | | |
|---|---|---|---|
| 5,756,948 A * | 5/1998 | Husby et al. ............. | 200/61.53 |
| 5,870,393 A | 2/1999 | Yano et al. | |
| 5,953,333 A | 9/1999 | Fox et al. | |
| 2002/0147533 A1* | 10/2002 | Foo et al. ..................... | 701/45 |
| 2003/0100983 A1* | 5/2003 | Bullinger et al. ............. | 701/45 |
| 2003/0120408 A1* | 6/2003 | Caruso et al. ................. | 701/45 |
| 2003/0182042 A1* | 9/2003 | Watson et al. ................. | 701/45 |
| 2004/0073346 A1* | 4/2004 | Roelleke ..................... | 701/45 |

FOREIGN PATENT DOCUMENTS

| | | |
|---|---|---|
| DE | 199 10 596 | 9/2000 |
| DE | 100 20 084 | 11/2001 |
| DE | 101 49 112 | 4/2003 |
| EP | 1 247 699 | 10/2002 |
| JP | 11255060 | 9/1999 |
| JP | 11321548 | 11/1999 |
| WO | WO 90/09298 | 8/1990 |

\* cited by examiner

*Primary Examiner*—Mark Hellner
*Assistant Examiner*—Helal A Algahaim
(74) *Attorney, Agent, or Firm*—Kenyon & Kenyon LLP

(57) ABSTRACT

A safety system for occupants of a vehicle having, e.g., acceleration sensors and/or pressure sensors for sensing a side crash. The safety system also includes a detector to detect the lateral velocity of the vehicle. The control of the restraining devices of the safety system is able to be influenced by the detected lateral velocity.

6 Claims, 4 Drawing Sheets

SAFETY SYSTEM FOR VEHICLE OCCUPANTS

FIELD OF INVENTION

The present invention relates to a safety system for vehicle occupants, and a method for controlling a safety system.

BACKGROUND INFORMATION

In addition to the acceleration sensors used in a central airbag control unit, at the present time peripheral acceleration sensors or pressure sensors are primarily used for sensing side crashes. The demands on crash detection are very high in the case of a side impact. Since the distance between the outer side of the vehicle and the vehicle occupant to be protected is very small, the decision about triggering or not triggering the side airbag or head airbag, for example, must be made in a very short time (e.g., 5-10 ms), so that these restraining devices can still inflate to provide protection. To achieve great robustness of the system with respect to unwanted triggerings of restraining devices, an additional, independent plausibilization circuit is used when detecting side crashes on the basis of signals from peripheral acceleration sensors. This is usually accomplished on the basis of the acceleration signal from a second acceleration sensor (e.g., positioned on the vehicle tunnel). Because of the acquisition of vehicle-dynamics data such as lateral acceleration, yaw rate, steering angle and wheel speeds possible today in vehicles having ESP (or other systems), the float angle as well as the longitudinal velocity and lateral velocity of the vehicle can be estimated. This information is also used for triggering reversible restraining devices, as well as the window lifters, the seat adjuster and the sunroof (pre-safe). However, the vehicle-dynamics information alone is not sufficient for triggering irreversible restraining devices.

German Patent Application No. DE 199 10 596 A1 describes a method and a system for controlling the triggering of restraining devices in a motor vehicle, provision being made to acquire actual values of the vehicle movement and to apply a triggering algorithm to the acquired actual values for generating triggering signals as needed for the triggering of at least one of the restraining devices. In so doing, the following steps are to be carried out: acquiring actual values of the vehicle movement; determining the setpoint state of the vehicle movement corresponding to the desired operating behavior of the vehicle; comparing an actual state of the vehicle movement, determined from at least a portion of the acquired actual values, to the corresponding setpoint state; parameterizing a triggering algorithm used for generating triggering signals, taking into account deviations between the actual state and the setpoint state of the vehicle movement; and application of the triggering algorithm to at least a portion of the acquired actual values for generating situation-adapted triggering signals as needed for triggering at least one of the restraining devices.

International Application WO 90/09298 also describes a method for triggering restraining devices in a safety system for vehicle occupants, in which an acceleration signal is measured, this acceleration signal is converted by time integration into a velocity, and in which at least one threshold value is specifiable for the velocity for forming a triggering criterion. In this method, the threshold value used as triggering criterion is moreover alterable as a function of one or more state variables or past state variables of the vehicle.

SUMMARY

The present invention may offer the advantage that, because of the estimate of the float angle, the longitudinal velocity and the lateral velocity (vL, vQ) available based on vehicle-dynamics data, it is possible to ascertain the approximate direction from which a crash can be expected. In this context, it is possible, in a manner matched to the specific driving situation, to adjust the parameters for controlling the respective restraining devices, especially the pyrotechnic side airbags and head airbags, or to make available a plausibility signal for a crash detection of the airbag control unit possibly taking place at a later point of time. The objective of the parameter adjustment (e.g., lowering of noise thresholds) is an optimized detection of the more probable crash event in each case. Moreover, detection of crash severity may also be improved by estimating the lateral velocity, in that the signals to be expected from the acceleration-based or pressure-based crash sensing are compared to the actually measured data, and a corresponding crash severity may be differentiated in a lesser or more severe crash from the deviating behavior.

One advantage of the present invention may be the possibility of optimizing the control of the irreversible, pyrotechnic restraining devices in the case of a crash, by the simultaneous, synergetic use of vehicle-dynamics data and data of the classic side-crash sensing (pressure and acceleration). In particular, a dangerous crash may thereby be detected earlier. This offers a time advantage, especially in the event of a side crash, since because of the short crash zone, only an extremely short reaction time is available for the activation of restraining devices.

BRIEF DESCRIPTION OF THE DRAWINGS

In the following, the present invention is explained in greater detail with reference to the figures.

DETAILED DESCRIPTION OF EXAMPLE EMBODIMENTS

Figure 1:
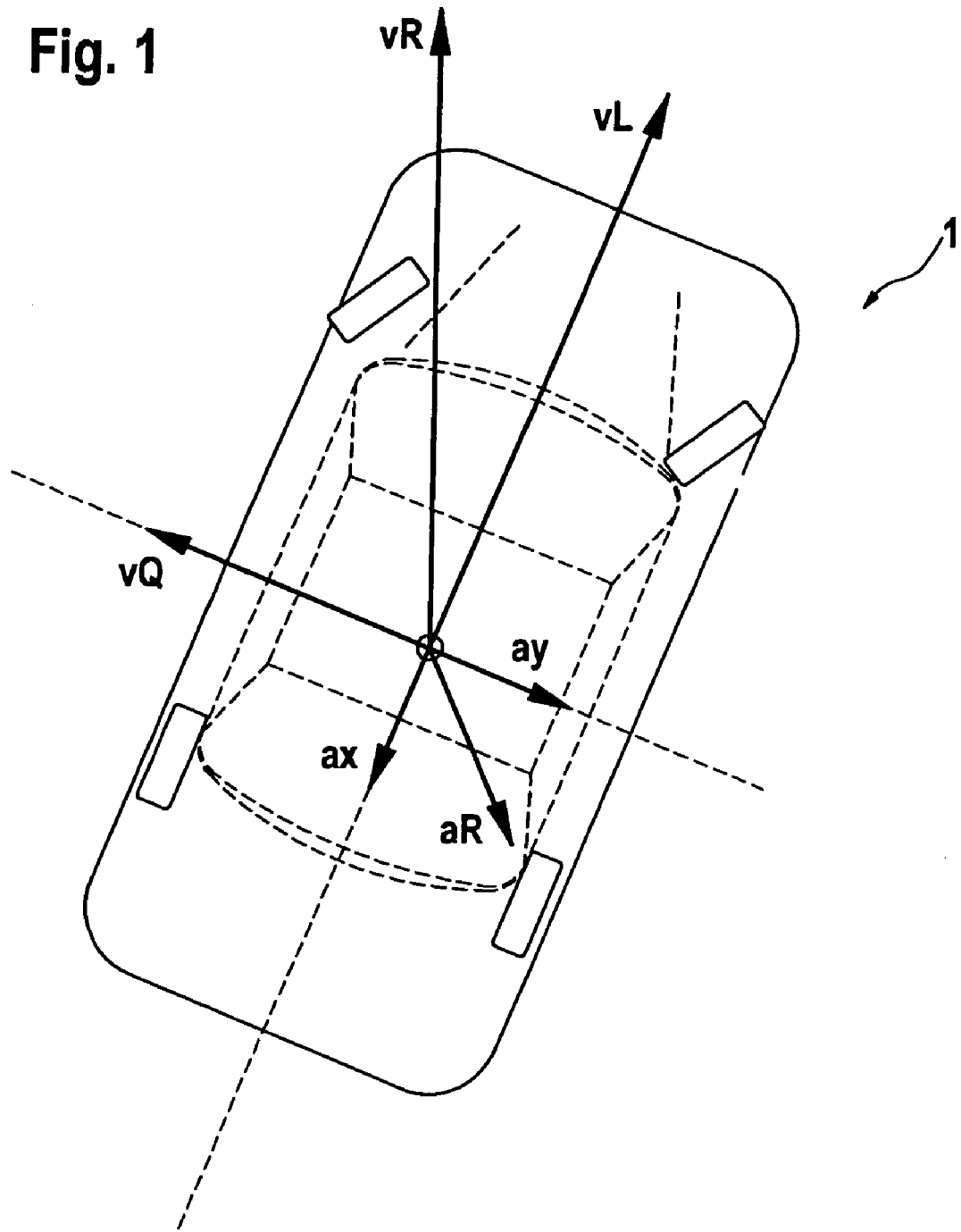
FIG. 1 shows a vehicle with representation of various vectors.

FIG. 1 shows a schematic representation of a vehicle 1 with a plurality of vectors in a coordinate system. Drawn in are the acceleration components in the X-direction and Y-direction, ax and ay, respectively, as well as the resulting acceleration aR. The velocity components in the longitudinal direction and lateral direction vL, vQ of vehicle 1, as well as the resulting velocity vR are also shown. The vehicle here, for example, is a laterally swerved vehicle in a very unstable driving condition. The present invention utilizes, in particular, the velocity component vQ in the lateral direction for the intended optimization of the decision for triggering restraining devices.

Figure 2:
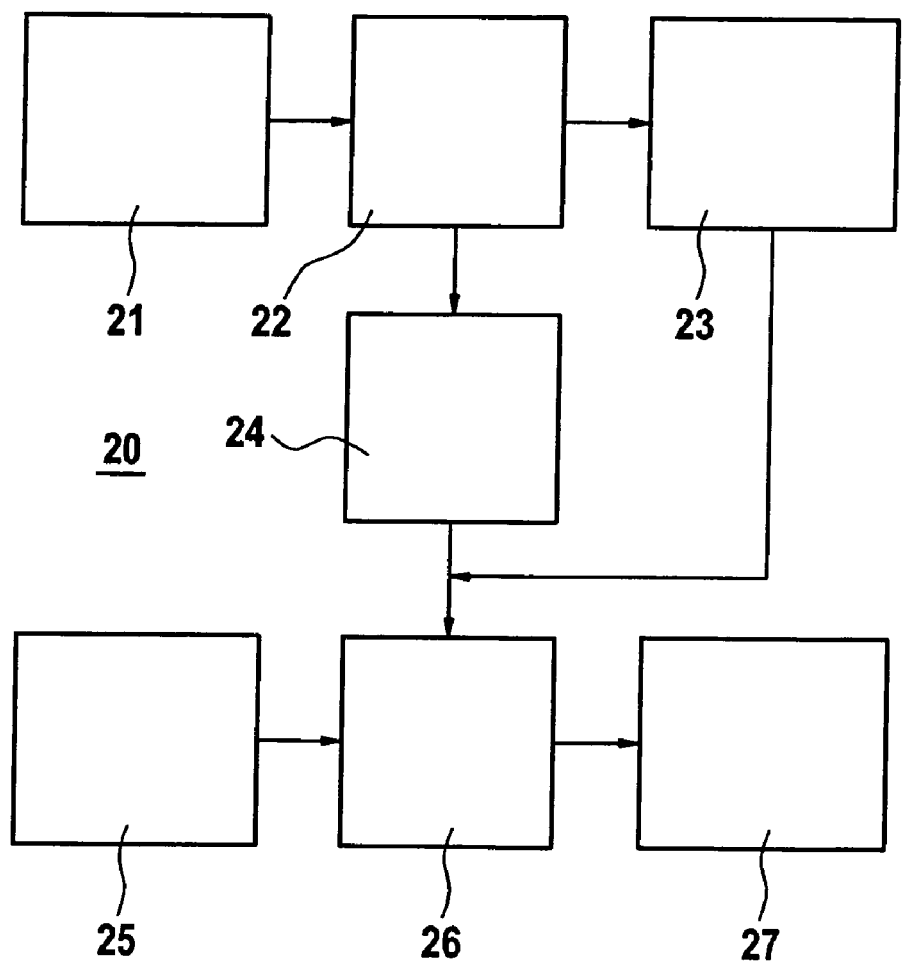
FIG. 2 shows a block diagram of a safety system.

FIG. 2 shows the block diagram of a safety system 20. Safety system 20 includes a plurality of function modules 21, 22, 23, 24, 25, 26, 27. A first function module 21 having assigned sensors (not shown in detail here) is used for detecting state variables of vehicle 1 explained later. This function module 21 is connected to a second function module 22. Function module 22 is connected to a function module 23 and a further function module 24. Function module 24 is connected to a further function module 26. Function module 23 is likewise connected to function module 26. Function module 26 is connected on one side to function module 25, and on the other side to function module 27. In the following, the functioning method of the safety system shown in FIG. 2 is explained, with reference to the flow chart shown in FIG. 3 and the diagram shown in FIG. 4, as well.

Figure 3:
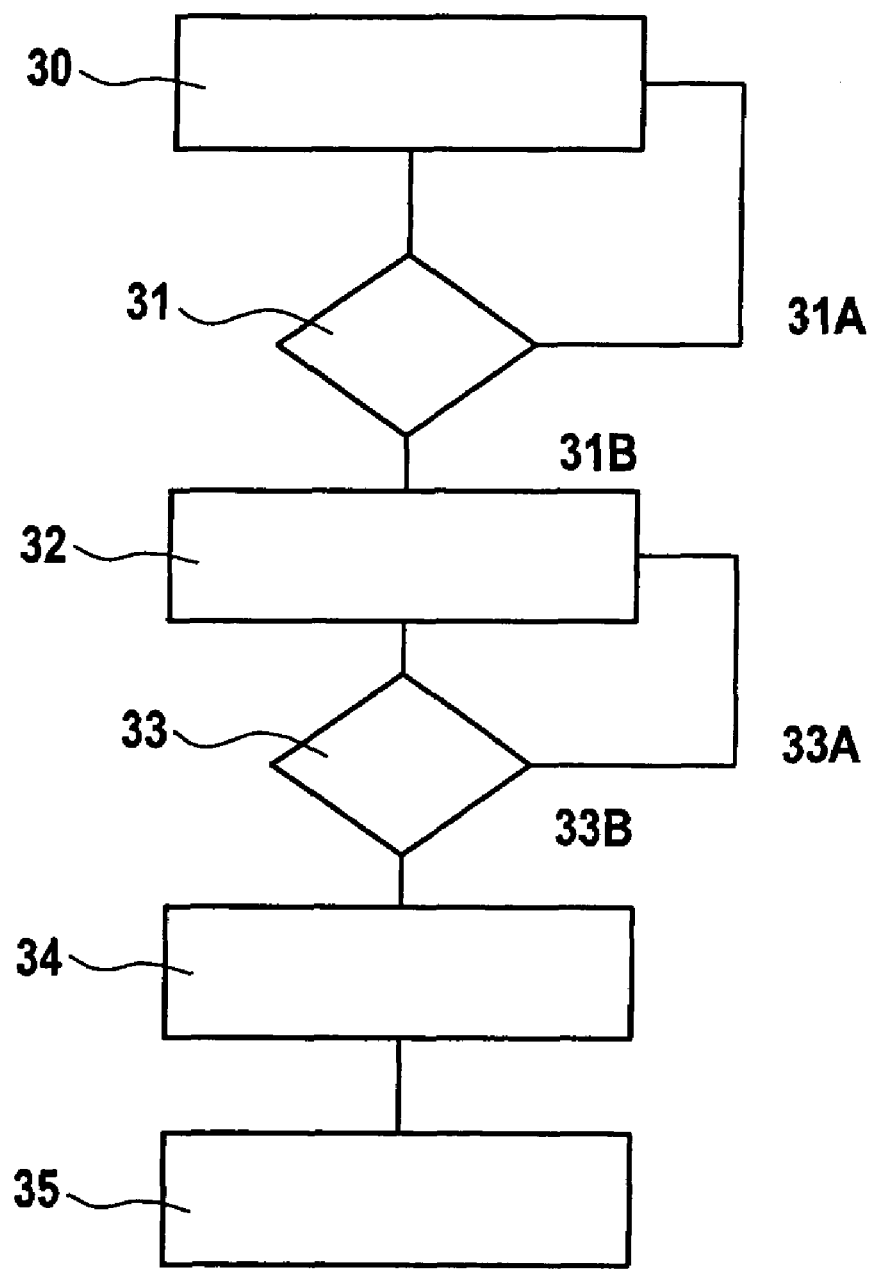
FIG. 3 shows a flow chart.
Figure 4:
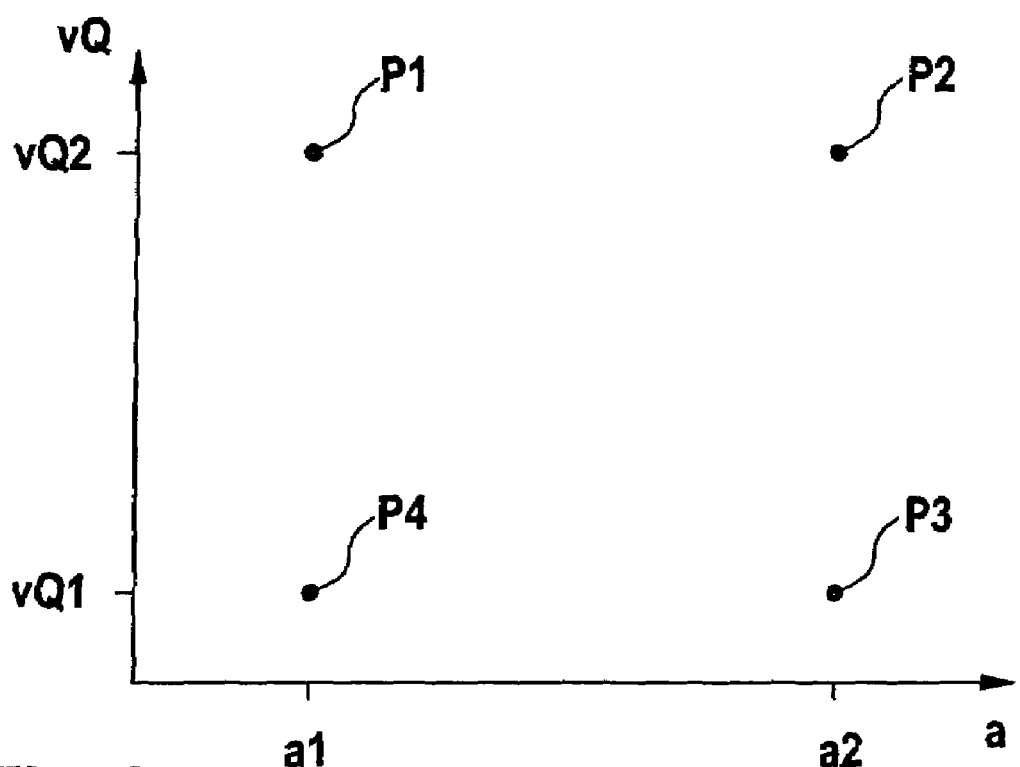
FIG. 4 shows a diagram with representation of the lateral velocity and the output signal of a side-crash sensor.

FIG. 3 shows that function module 21 having assigned sensors (not shown in detail here) is used for acquiring vehicle-dynamics data in step 30. In particular, values for wheel speed, braking pressure and torque of vehicle 1 are thus acquired using suitable sensors. A further function module 22 having control-unit function receives this vehicle-dynamics data and relays at least part of this data unaltered as raw data to function module 24. Secondly, function module 22 processes at least a subsection of the data received from function module 21 and, for example, calculates directional information, longitudinal velocity and lateral velocity of the vehicle, as well as the float angle of the vehicle from it. These results are relayed to function module 23. In this way, available at the output of function module 24 is, on one hand, the raw data relayed by function module 22, and additionally the quantities calculated from this raw data by function module 22, which are transmitted altogether to function module 26. Acceleration components ax, ay, az of three axes, acceleration components ayl, ayr of side impact sensors (PAS), as well as signals from yaw-rate sensors are acquired by function module 25 and passed on to function module 26. Control signals for the restraining devices such as airbag, side airbag, head airbags, window airbags and seat-belt tensioners, combined schematically in function module 27, are derived from this input data in function module 26. System 20 ascertains the estimated quantities for the float angle, as well as the longitudinal velocity and lateral velocity from the different data measured for assessing the vehicle dynamics. In step 31 a comparison is made, if the slight lateral velocity vQ in the normal driving condition exceeds a certain limit, or if by monitoring the vehicle-dynamics data in another manner a driving condition deviating from the normal condition is detected in which there is an increased risk for a lateral crash with an obstacle, the corresponding information is transmitted to function module 26 in step 31B, and if not, then in step 31A processing is returned to step 30. In step 32, function module 26 generates a pattern from the data. Alternatively, the increased risk of a crash may also be detected by function module 26 with the aid of sensor data made available to it by a vehicle-dynamics analysis system (e.g., via a data bus). In function module 26, by adjustment of the algorithmic parameters, the information about the increased probability of a specific crash event is now utilized to permit an early plausibilization and possibly even triggering of the restraining devices relevant for this crash in step 35. If a reliable estimate of the lateral velocity and longitudinal velocity is available based on the vehicle-dynamics data, possibly with the additional use of acceleration data from function module 26, this estimate may advantageously be used as additional information for detecting crash severity. In many cases in which an unstable driving condition (e.g., lateral breakaway, skid) precedes a crash event (see, for example, the depiction of vehicle 1 in FIG. 1), it involves a collision with a stationary object or a collision with an object having comparatively low velocity, so that the longitudinal velocity and lateral velocity correlate closely with the relative impact velocity. For example, this information may therefore be utilized particularly in an early crash phase, in conjunction with the acceleration signals and/or pressure signals, for detecting the crash severity. A specific pattern of the acceleration data and/or pressure data can be expected in the event of a lateral impact with specific velocity against a fixed obstacle. In step 33 a comparison is made, if the pattern of the measured data deviates from the expected data, it is possible to distinguish between a lesser or more severe crash in step 33B, and if not, then in step 33A processing is returned to step 32. In step 34 the control of the restraining devices may be adapted accordingly.

The advantages attainable using the present invention can be underlined based on the following examples. In a first exemplified case, vehicle 1 running off the roadway crashes with high lateral velocity vQ2 (FIG. 4) into a massive obstacle such as a tree. The large output signals a2 of the pressure and acceleration sensors occurring in this case, in conjunction with the high lateral velocity vQ2 detected (diagram point P2), point unmistakably to a crash event severely endangering the occupants. In this way, control commands for activating restraining devices 27 may be generated early on. It is thereby possible to gain valuable time, especially in the event of a side impact, since in this case only a comparatively short crash zone is available. In a second exemplified case, vehicle 1 crashes with high lateral velocity vQ2 into a light obstacle such as an empty trash can. Since in this exemplified case, substantially smaller output signals al (diagram point P1 in FIG. 4) of the pressure and acceleration sensors occur, such a crash is classified as uncritical. The triggering of restraining devices is avoided. In a third exemplified case, the vehicle crashes with relatively low lateral velocity vQ1 into a massive obstacle such as a tree. Comparatively high output signals a2 (diagram point P3 in FIG. 4) of pressure and acceleration sensors can be expected in this case, as well. Restraining devices can be triggered in good time. However, the triggering of restraining devices may at least be prepared by plausibilization and/or adjustment of triggering threshold values in such a way that, if necessary, restraining devices may be activated rapidly. Finally, in a fourth exemplified case, vehicle 1 crashes with relatively low lateral velocity vQl into an empty trash can. Relatively low output signals al of pressure and acceleration sensors can be expected in this case as well (diagram point P4 in FIG. 4). This case represents no danger to the occupants of vehicle 1. Triggering of restraining devices is therefore suppressed.

We claim:

1. A safety system for occupants of a vehicle, comprising:
   a side crash sensor including at least one of an acceleration sensor and a pressure sensor, the side crash sensor configured to sense a side crash;
   a detector to detect a lateral velocity of the vehicle, control of restraining devices of the safety system being influenced by the detected lateral velocity; and
   a function module to generate a pattern, the pattern being compared to expected data in determining severity of the side crash;
   wherein a float angle of the vehicle is ascertained from measured values of the vehicle-dynamics quantity, the float angle being taken into account in the control of the safety system,
   wherein the safety system is controlled as a function of the side-crash sensing and the detected lateral velocity, the safety system having a response that is varied based on a determined severity of the side crash, and
   wherein in response to a high measured value of the side-crash sensing and a low measured value of the lateral velocity, a triggering algorithm of the safety system is parameterized in a direction of a higher triggering sensitivity.

2. The safety system as recited in claim 1, further comprising:
   a comparator configured to compare the detected lateral velocity to a specifiable limiting value of the lateral velocity.

3. The safety system as recited in claim 1, further comprising:
   a storage device which stores limiting values of the lateral velocity as a function of limiting values of the side crash sensor.

4. A method for controlling a safety system for occupants of a vehicle, comprising:
   sensing a side crash;
   acquiring vehicle-dynamics quantities of the vehicle including a lateral velocity of the vehicle;
   generating a pattern from measured data;
   comparing the pattern to expected data to determine severity of the side crash;
   controlling the safety system as a function of the side-crash sensing and the detected lateral velocity, the safety system having a response that is varied based on a determined severity of the side crash; and
   ascertaining a float angle of the vehicle from measured values of the vehicle-dynamics quantity, the float angle being taken into account in the control of the safety system;
   wherein in response to a high measured value of the side-crash sensing and a low measured value of the lateral velocity, a triggering algorithm of the safety system is parameterized in a direction of a higher triggering sensitivity.

5. The method as recited in claim 4, wherein restraining devices of the safety system are prepared for triggering or are triggered.

6. The safety system as recited in claim 1, further comprising:
   a comparator configured to compare the detected lateral velocity to a specifiable limiting value of the lateral velocity; and
   a storage device to store limiting values of the lateral velocity as a function of limiting values of the side crash sensor.

* * * * *